United States Patent
Uhrich et al.

(10) Patent No.: US 9,651,456 B2
(45) Date of Patent: May 16, 2017

(54) DUAL HEGO METHOD FOR IDENTIFICATION AND MITIGATION OF AIR-FUEL IMBALANCE FAULTS

(71) Applicant: Ford Global Technologies, LLC, Dearborn, MI (US)

(72) Inventors: Michael James Uhrich, West Bloomfield, MI (US); Mario Anthony Santillo, Canton, MI (US); Stephen William Magner, Farmington Hills, MI (US); Mrdjan J. Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 14/334,375

(22) Filed: Jul. 17, 2014

(65) Prior Publication Data

US 2016/0018291 A1  Jan. 21, 2016

(51) Int. Cl.
| | |
|---|---|
| *G01M 15/10* | (2006.01) |
| *F01N 11/00* | (2006.01) |
| *F01N 13/00* | (2010.01) |
| *G01M 1/14* | (2006.01) |
| *F02D 41/00* | (2006.01) |
| *F02D 41/14* | (2006.01) |
| *F01N 3/08* | (2006.01) |
| *F01N 3/10* | (2006.01) |

(52) U.S. Cl.
CPC ......... *G01M 15/104* (2013.01); *F01N 11/007* (2013.01); *F01N 13/008* (2013.01); *F02D 41/0085* (2013.01); *F02D 41/1454* (2013.01); *G01M 1/14* (2013.01); *F01N 3/08* (2013.01); *F01N 3/101* (2013.01); *F01N 2550/02* (2013.01); *F01N 2560/025* (2013.01); *F01N 2560/14* (2013.01); *F02D 41/1439* (2013.01); *F02D 41/1441* (2013.01); *F02D 2250/32* (2013.01); *G01M 15/10* (2013.01); *Y02T 10/22* (2013.01)

(58) Field of Classification Search
CPC ............. F02D 41/1441; F02D 41/1454; F02D 41/0085; F01N 11/007; F01N 2550/02; F01N 13/008; G01M 15/104; G01M 1/14
USPC ...................................... 73/114.49
See application file for complete search history.

(56) References Cited

U.S. PATENT DOCUMENTS

| | | | |
|---|---|---|---|
| 6,301,880 B1 * | 10/2001 | Cullen ................ | F02D 41/1443 123/443 |
| 6,438,946 B1 * | 8/2002 | Majima ............... | F02D 41/1441 60/276 |
| 6,904,751 B2 * | 6/2005 | Makki .................. | F01N 11/002 60/274 |

(Continued)

*Primary Examiner* — Freddie Kirkland, III
(74) *Attorney, Agent, or Firm* — Julia Voutyras; McCoy Russell LLP (57) ABSTRACT

Systems and methods for identifying and mitigating air-fuel imbalance faults specific to an engine cylinder are provided. In one embodiment, a method comprises indicating a cylinder imbalance by comparing time-aligned readings from exhaust gas oxygen sensors, the exhaust gas oxygen sensors positioned symmetrically opposite each other within an exhaust passage downstream of a catalyst. In this way, an air-fuel imbalance fault may be accurately detected in a non-uniform exhaust flow so that mitigating actions can be taken, resulting in reduced tailpipe emissions.

20 Claims, 8 Drawing Sheets

(56) References Cited

U.S. PATENT DOCUMENTS

| | | | | |
|---|---|---|---|---|
| 7,549,283 B2* | 6/2009 | Kerns | ............ | F01N 11/007 |
| | | | | 60/276 |
| 7,802,563 B2* | 9/2010 | Behr | ............ | F02D 41/0082 |
| | | | | 123/692 |
| 8,047,064 B2* | 11/2011 | Iwazaki | ............ | G01M 15/104 |
| | | | | 73/114.72 |
| 8,261,727 B2* | 9/2012 | Bagnasco | ............ | F02D 41/0085 |
| | | | | 123/436 |
| 8,594,906 B2* | 11/2013 | Suetsugu | ............ | F02D 41/1456 |
| | | | | 123/692 |
| 9,217,383 B2* | 12/2015 | Bagnasco | ............ | F02D 41/0085 |
| 9,279,378 B2* | 3/2016 | Katayama | ............ | F02D 41/0085 |
| 2005/0284133 A1* | 12/2005 | Kerns | ............ | F01N 11/007 |
| | | | | 60/285 |
| 2009/0241925 A1* | 10/2009 | Behr | ............ | F02D 41/0082 |
| | | | | 123/690 |
| 2013/0255631 A1* | 10/2013 | Ruhland | ............ | F02D 41/30 |
| | | | | 123/445 |

* cited by examiner

DUAL HEGO METHOD FOR IDENTIFICATION AND MITIGATION OF AIR-FUEL IMBALANCE FAULTS

BACKGROUND AND SUMMARY

Modern vehicles use three-way catalysts (TWC) for exhaust after-treatment of gasoline engines. With tightening government regulations on automobile emissions, feedback control is used to adequately regulate the engine air-to-fuel ratio (AFR). Some vehicles have a universal exhaust gas oxygen (UEGO) sensor upstream of the TWC and a heated exhaust gas oxygen (HEGO) sensor downstream of the TWC to control the AFR near stoichiometry. This is achieved by regulated the AFR to a set-point around stoichiometry, which in turn is fine-tuned based on the deviation of a HEGO voltage from a pre-determined HEGO-voltage set-point.

However, the physical geometry and arrangement of engine cylinders creates a non-uniform, zoned exhaust flow condition in the exhaust system. Various faults, such as an AFR imbalance between cylinders, may exacerbate this non-uniform, zoned exhaust flow condition so that the UEGO sensor may not equally detect all of the cylinders. An AFR imbalance between cylinders occurs when the AFR in one or more cylinders is different than the other cylinders due to a cylinder-specific malfunction, such as an intake manifold leak at a particular cylinder, a fuel injector problem, an individual cylinder exhaust gas recirculation runner imbalance, or a fuel-flow delivery problem. The detection of a cylinder with an air-fuel mal-distribution would require a rather large imbalance. This can lead to significant feedgas emissions such as carbon monoxide (CO) or the oxides of nitrogen (NOx) passing directly to the tailpipe, as the biased air/fuel mixture is fed directly to the catalyst, overwhelming the oxygen-storage buffer that allows for short deviations from stoichiometry.

The inventors herein have recognized the above issues and have devised various approaches to solve them. In particular, systems and methods for identifying and mitigating air-fuel imbalance faults specific to an engine cylinder are provided. In one embodiment, a method comprises indicating a cylinder imbalance by comparing time-aligned readings from exhaust gas oxygen sensors, the exhaust gas oxygen sensors positioned symmetrically opposite each other within an exhaust passage downstream of a catalyst. In this way, an air-fuel imbalance fault may be accurately detected in a non-uniform exhaust flow. Mitigating actions can be taken once an air-fuel imbalance fault is detected, resulting in reduced tailpipe emissions.

In another embodiment, a method comprises: indicating a cylinder imbalance by comparing time-aligned readings from exhaust gas oxygen sensors, the exhaust gas oxygen sensors positioned symmetrically opposite each other within an exhaust passage downstream of a catalyst; and selecting one of the exhaust gas oxygen sensors to use for outer loop control. In this way, a rich or lean cylinder-specific air-fuel imbalance fault may be identified.

In another embodiment, a method comprises: indicating a cylinder imbalance by comparing time-aligned readings from exhaust gas oxygen sensors, the exhaust gas oxygen sensors positioned symmetrically opposite each other within an exhaust passage downstream of a catalyst; selecting one of the exhaust gas oxygen sensors for outer loop control; and adjusting fuel sequentially to individual cylinders to indicate which cylinder is imbalanced. In this way, a specific cylinder with an air-fuel imbalance fault may be identified and the fault mitigated such that tailpipe emissions are maintained within regulated levels.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
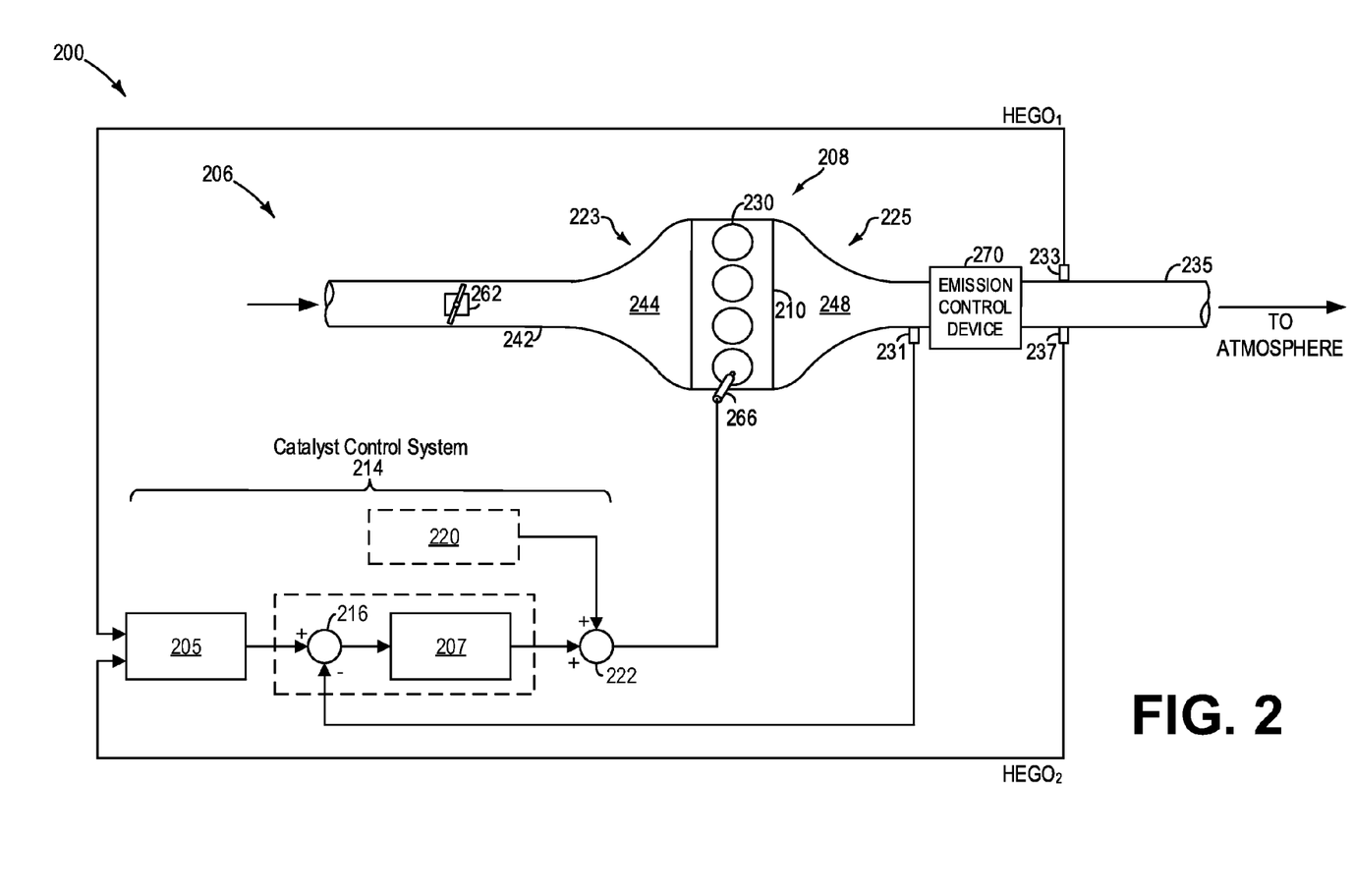
FIG. 2 shows a schematic illustration of an example catalyst control architecture.
Figure 3:
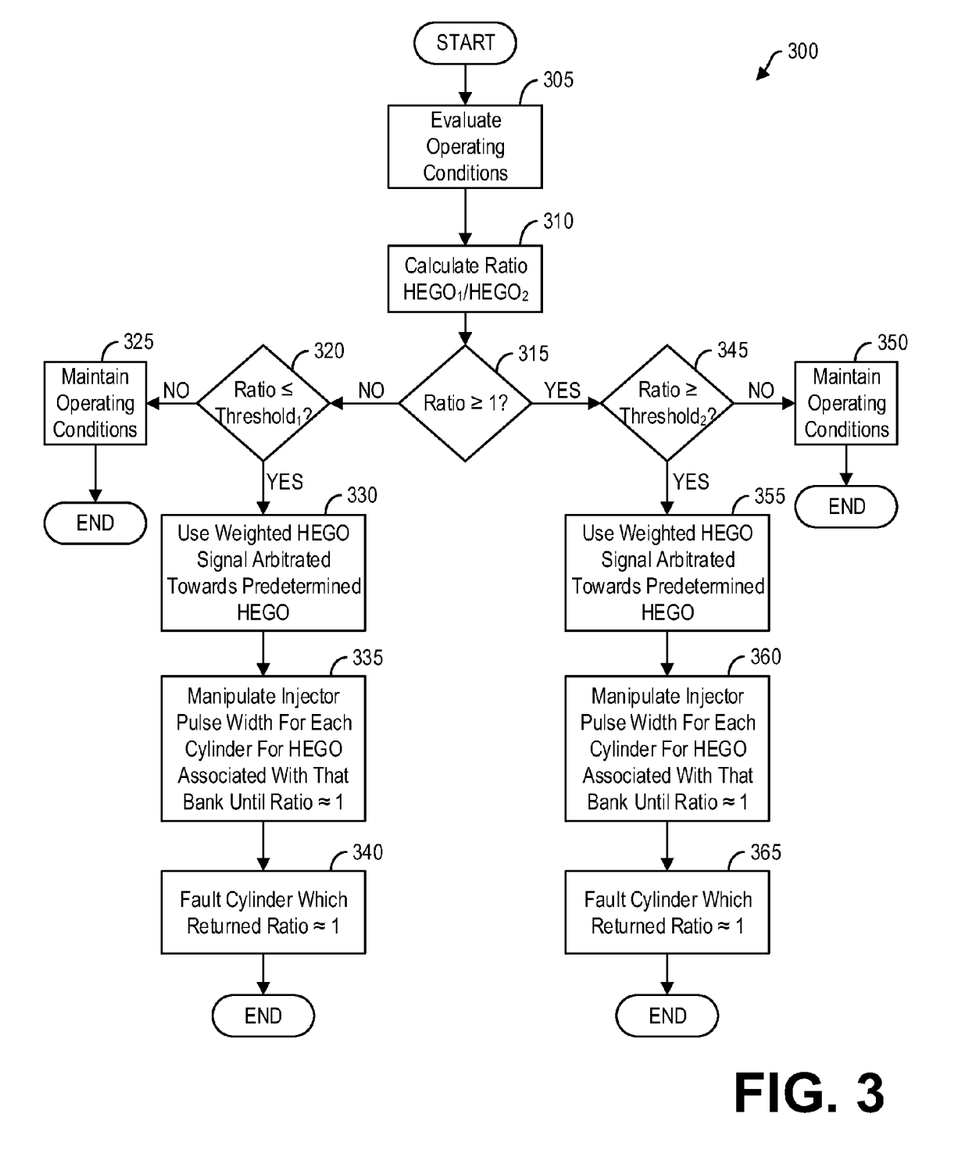
FIG. 3 shows a high-level flow chart illustrating an example method for identifying and mitigating air-fuel imbalance faults.
Figure 4:
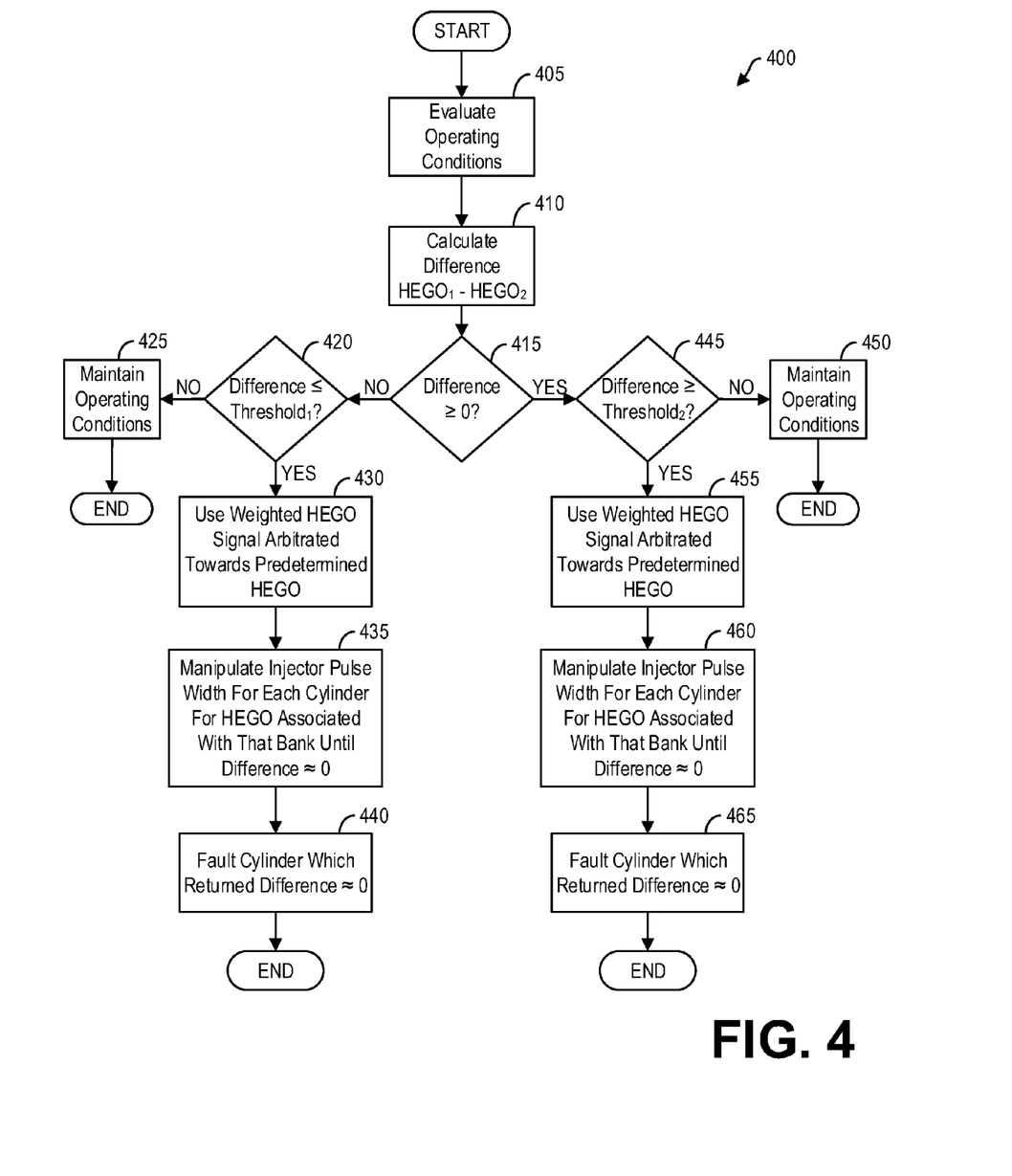
FIG. 4 shows a high-level flow chart illustrating an example method for identifying and mitigating air-fuel imbalance faults.
Figure 5:
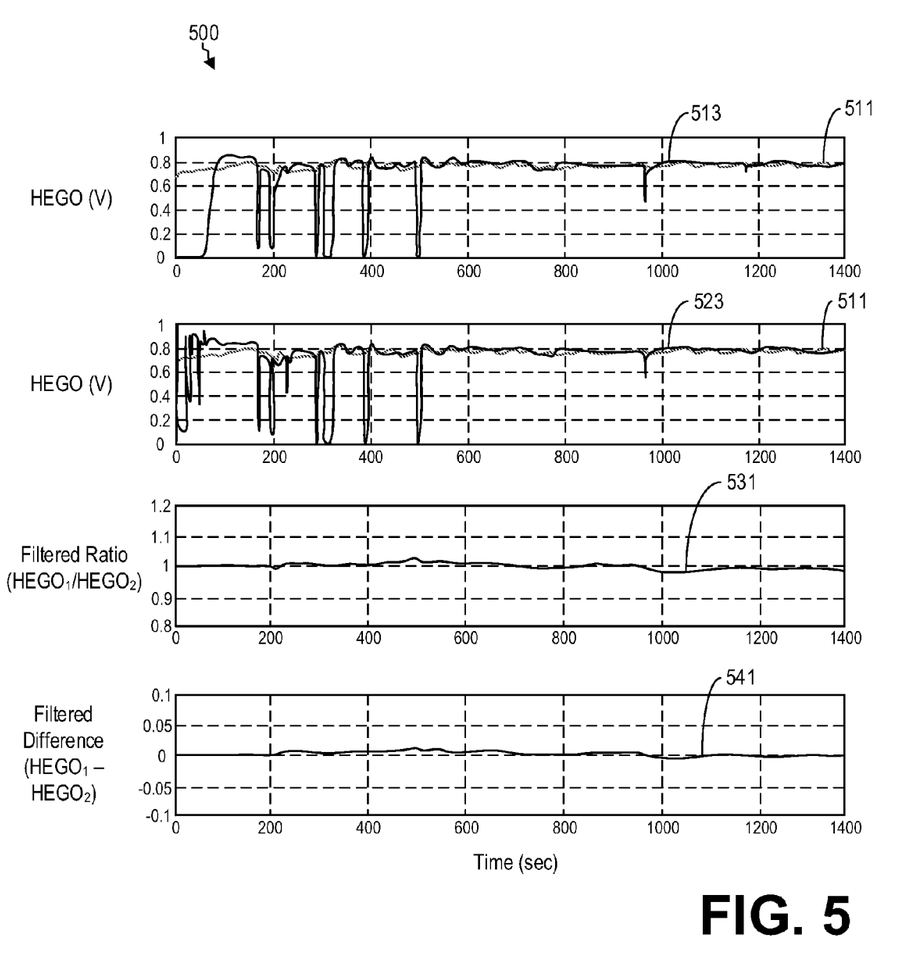
FIG. 5 shows a set of graphs illustrating example results for vehicle data without air-fuel imbalance faults.
Figure 6:
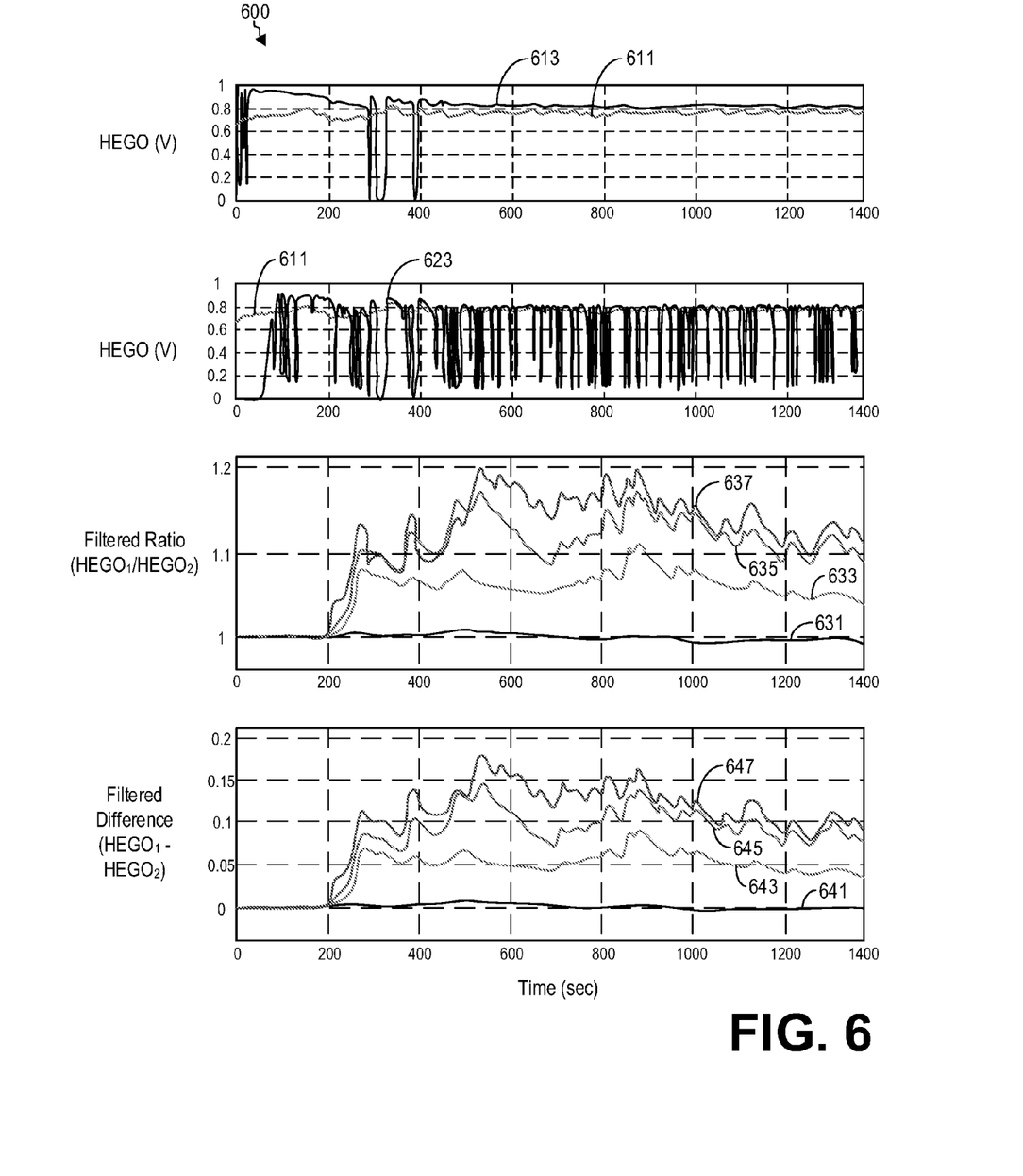
FIG. 6 shows a set of graphs illustrating example results for vehicle data with rich air-fuel imbalance faults.
Figure 7:
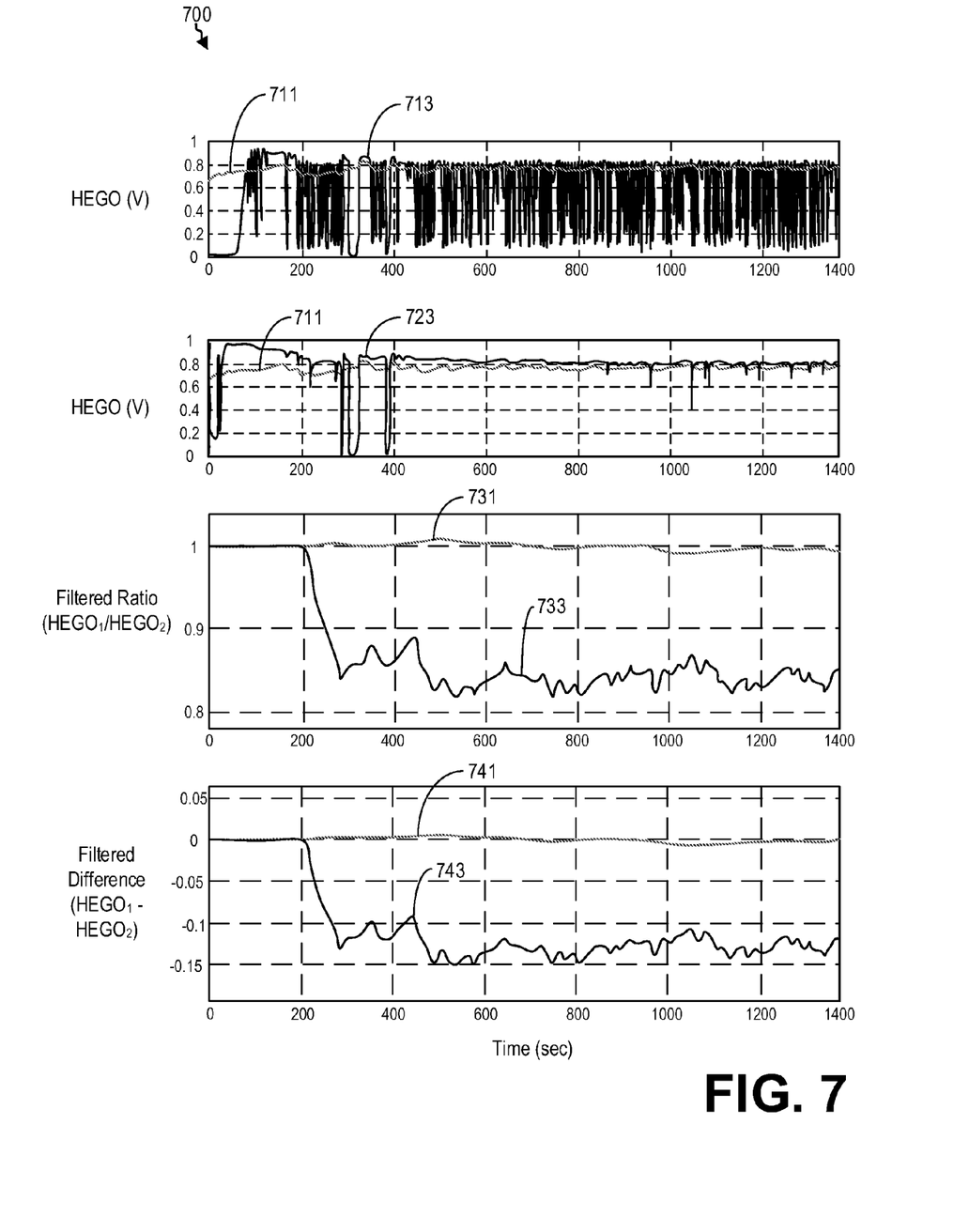
FIG. 7 shows a set of graphs illustrating example results for vehicle data with lean air-fuel imbalance faults.
Figure 8:
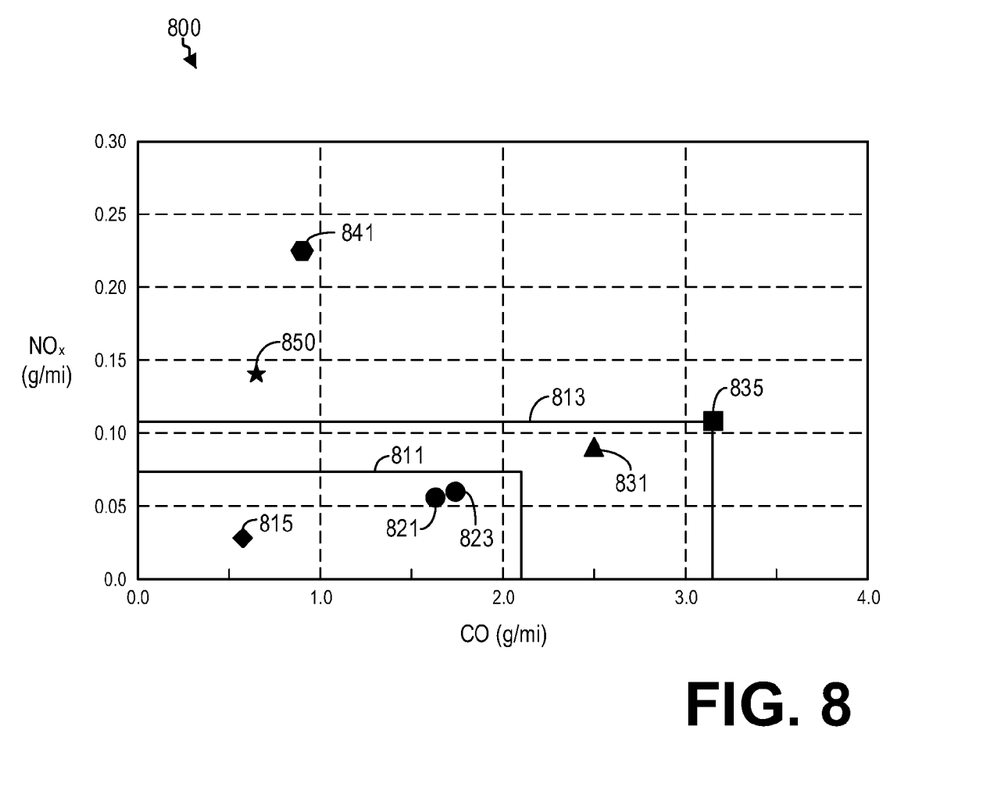
FIG. 8 shows a graph illustrating tailpipe emissions generated in the presence of rich air-fuel imbalance faults.

The present description is related to identifying and mitigating air-fuel imbalance faults. Specifically, methods and systems for identifying and mitigating air-fuel imbalance faults specific to an engine cylinder are described. The systems and methods may be implemented in a vehicle, such as the vehicle system depicted in FIG. 1. As depicted in FIG. 2, the vehicle may include a multi-cylinder engine system and an exhaust after-treatment system. If one of the multiple cylinders has an air-fuel imbalance fault, the exhaust flow may be non-uniform and a single exhaust gas oxygen sensor may not detect the imbalance until the imbalance is large. In order to detect and correct for such imbalance faults, multiple exhaust gas oxygen sensors may be included, as shown. These exhaust gas oxygen sensors may comprise a catalyst control architecture including inner and outer control loops. Methods for identifying and mitigating air-fuel imbalance faults specific to a cylinder are depicted in FIGS. 3 and 4. FIGS. 5-7 show example data demonstrating the methods depicted in FIGS. 3 and 4, while FIG. 8 shows example emissions results for different control approaches.

Figure 1:
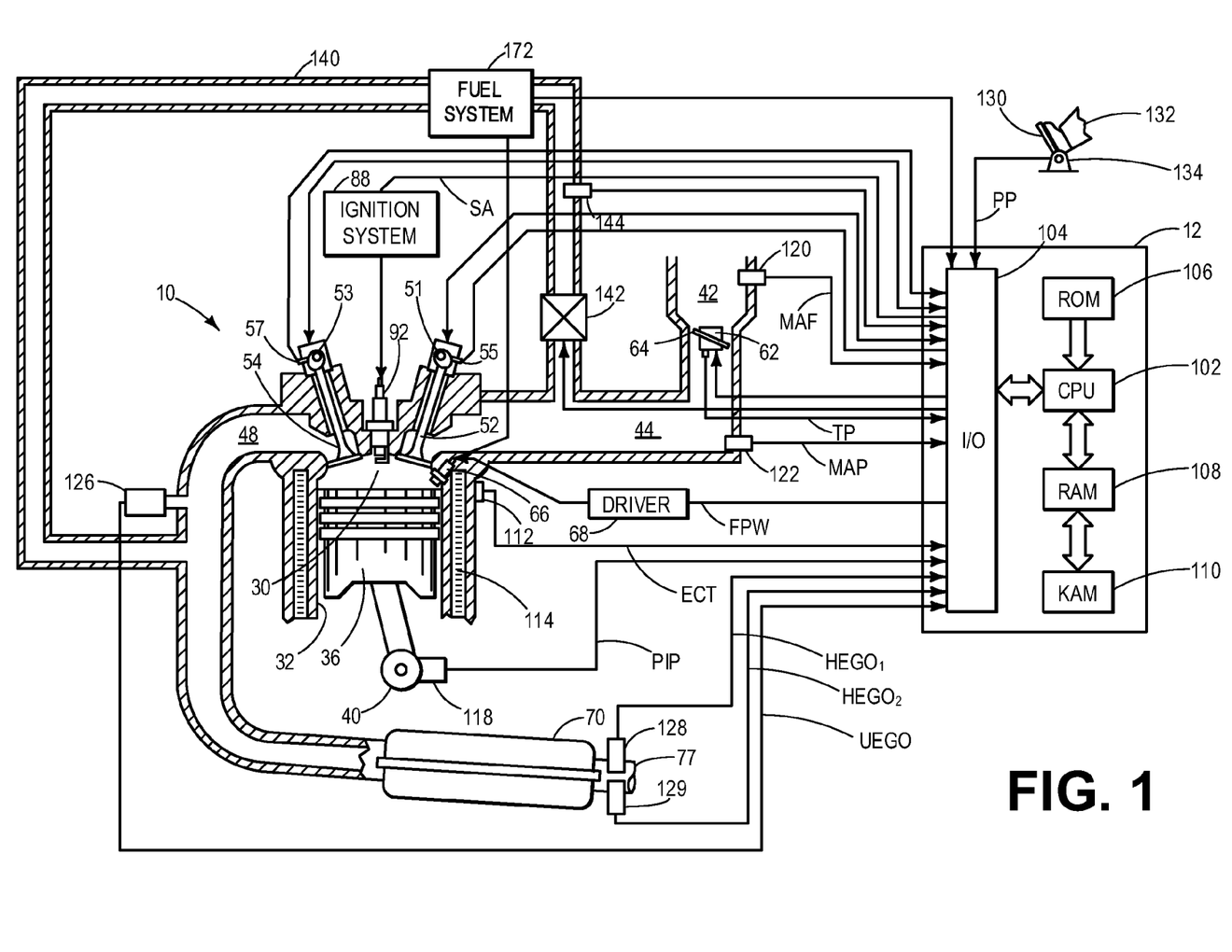
FIG. 1 shows a schematic depiction of an example vehicle system.

FIG. 1 illustrates a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves. In this example, intake valve 52 and exhaust valve 54 may be controlled by cam actuation via one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66, which is supplied fuel from fuel system 172. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion cylinder 30.

It will be appreciated that in an alternate embodiment, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

An upstream exhaust gas sensor 126 is shown coupled to exhaust passage 48 upstream of emission control device 70. Upstream sensor 126 may be any suitable sensor for providing an indication of exhaust gas air-fuel ratio such as a linear wideband oxygen sensor or UEGO (universal or wide-range exhaust gas oxygen), a two-state narrowband oxygen sensor or EGO, a HEGO (heated EGO), a NOx, HC, or CO sensor. In one embodiment, upstream exhaust gas sensor 126 is a UEGO configured to provide output, such as a voltage signal, that is proportional to the amount of oxygen present in the exhaust. Controller 12 uses the output to determine the exhaust gas air-fuel ratio.

Emission control device 70 is shown arranged along exhaust passage 48 downstream of exhaust gas sensor 126. Device 70 may be a three-way catalyst (TWC), configured to reduce NOx and oxidize CO and unburnt hydrocarbons. In some embodiments, device 70 may be a NOx trap, various other emission control devices, or combinations thereof.

A second, downstream exhaust gas sensor 128 is shown coupled to exhaust passage 48 downstream of emissions control device 70. Downstream sensor 128 may be any suitable sensor for providing an indication of exhaust gas air-fuel ratio such as a UEGO, EGO, HEGO, etc. In one embodiment, downstream sensor 128 is a HEGO configured to indicate the relative enrichment or enleanment of the exhaust gas after passing through the catalyst. As such, the HEGO may provide output in the form of a switch point, or the voltage signal at the point at which the exhaust gas switches from lean to rich.

A third, downstream exhaust gas sensor 129 is shown coupled to exhaust passage 48 downstream of emissions control device 70 and symmetrically opposed to HEGO sensor 128. Downstream sensor 129 may be any suitable sensor for providing an indication of exhaust gas air-fuel ratio such as a UEGO, EGO, HEGO, etc. In one embodiment, downstream sensor 129 is a HEGO configured to indicate the relative enrichment or enleanment of the exhaust gas after passing through the catalyst. As such the HEGO may provide output in the form of a switch point, or the voltage signal at the point at which the exhaust gas switches from lean to rich.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure (MAP) signal from sensor 122. Engine speed, RPM, may be generated by controller 12 from signal PIP.

Storage medium read-only memory 106 can be programmed with computer readable data representing non-transitory instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

FIG. 2 shows a schematic illustration of inner and outer feedback control loops for a catalyst control architecture 200. Catalyst control architecture 200 includes a vehicle system 206 and a catalyst control system 214, where the vehicle system 206 includes a multi-cylinder engine system 208 coupled to an engine exhaust 225.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors, as depicted, for example, in FIG. 1.

The vehicle system 206 may further include a catalyst control system 214. Catalyst control system 214 is shown receiving information from exhaust gas oxygen sensors 231, 233, and 237 and sending control signals to fuel injectors 266. As one example, exhaust gas oxygen sensors may include exhaust gas sensor 231 located upstream of the emission control device 270, and exhaust gas sensors 237 and 233 located downstream of the emission control device 270 and symmetrically opposed to each other. Other sensors such as pressure, temperature, air-fuel ratio, and composition sensors may be coupled to various locations in the vehicle system 206. The catalyst control system 214 may receive input data from the various sensors, process the input data, and trigger the actuators in response to the processed input data based on instruction or code programmed therein corresponding to one or more routines. Catalyst control system 214 may be configured with instructions stored in non-transitory memory that cause catalyst control system 214 to perform control routines via one or more actuators based on information received via one or more sensors. Example control routines are described herein with reference to FIGS. 3 and 4.

In one embodiment, emission control device 270 is a three-way catalyst, exhaust gas sensor 231 is a UEGO sensor, and exhaust gas sensors 233 and 237 are HEGO sensors. As discussed further herein, the dual HEGO configuration shown enables catalyst control system 214 to detect a non-uniform, zoned exhaust flow due to a cylinder 230 with an air-fuel mal-distribution.

Catalyst control system 214 regulates the air-to-fuel ratio (AFR) to a set point near stoichiometry and fine-tunes this regulation based on the deviation of a HEGO voltage from a pre-determined HEGO-voltage set point Inner-loop controller 207 uses the upstream UEGO sensor 231 for higher-bandwidth feedback control while outer-loop controller 205 uses the HEGO sensors 233 and 237 for lower-bandwidth control. Catalyst control system 214 may be implemented by an engine controller, such as controller 12.

Inner-loop controller 207, comprising a proportional-integral-derivative (PID) controller, controls the engine AFR by generating an appropriate fuel command (e.g., fuel pulse width). Summing junction 222 combines the fuel command from inner-loop controller 207 with commands from feed-forward controller 220. This combined set of commands is delivered to the fuel injectors 266 of engine 210. UEGO sensor 231 provides a feedback signal to the inner-loop controller 207, the UEGO feedback signal proportional to the oxygen content of the feedgas or engine exhaust between the engine 210 and TWC 270. Outer-loop controller 205 generates a UEGO reference signal provided to the inner-loop controller 207. The UEGO reference signal is combined with the UEGO feedback signal at junction 216. The error or difference signal provided by junction 216 is then used by inner-loop controller 207 to adjust the fuel command so that the actual AFR within engine 210 approaches the desired AFR. HEGO sensors 233 and 237 provide feedback signals $HEGO_1$ and $HEGO_2$, respectively, to the outer loop controller 205. The HEGO feedback signals may be used to adjust the UEGO reference signal, or air-fuel ratio reference signal, provided to inner-loop controller 207 via junction 216.

Using two HEGO sensors, multiple techniques may be implemented to identify and mitigate air-fuel imbalance fault that produce zoned exhaust flow. In particular, methods described further herein comprise indicating a cylinder imbalance by comparing time-aligned readings from exhaust gas oxygen sensors, the exhaust gas oxygen sensors positioned symmetrically opposite each other within an exhaust passage downstream of a catalyst, selecting one of the exhaust gas oxygen sensors for outer loop control, and adjusting fuel sequentially to individual cylinders to indicate which cylinder is imbalanced.

In one example, comparing time-aligned readings from exhaust gas sensors comprises calculating a ratio of both HEGO signals, for example, $HEGO_1/HEGO_2$. If the exhaust flow is uniform, the HEGO signals will be identical and the ratio will equal one. Any non-uniformity in the exhaust flow will result in a variation between HEGO signals, and therefore the ratio will be greater than or less than one. Therefore, in some embodiments, outer-loop controller 205 may compute the ratio $HEGO_1/HEGO_2$ and utilize the result when generating the air-fuel ratio reference signal. For example, a HEGO ratio greater than one indicates that at least one of the cylinders has an air-fuel imbalance rich or lean of stoichiometry. Outer-loop controller 205 may then determine which HEGO signal, $HEGO_1$ or $HEGO_2$, exhibits more activity and is therefore more representative of the detected imbalance. The more representative HEGO signal may then be used to generate an air-fuel ratio command. However, in some examples, a weighted average of the multiple HEGO signals may be used to generate an air-fuel ratio command. Furthermore, a HEGO ratio may indicate the fault direction, rich or lean, for a particular cylinder. For example, a HEGO ratio greater than one may correspond to a first cylinder with a rich imbalance or a second cylinder with a lean imbalance. Therefore, a first air-fuel ratio may be commanded to the first cylinder to correct for a rich imbalance; if this first air-fuel ratio command corrects the imbalance (that is, returns the ratio to one), then the first cylinder may be identified as the faulted cylinder. If the first air-fuel ratio command does not correct the imbalance by returning the ratio to one, then a second air-fuel ratio may be commanded to the second cylinder to correct for a lean imbalance; if this second air-fuel ratio command corrects the imbalance by returning the ratio to one, then the second cylinder may be identified as the faulted cylinder. Note that a HEGO signal ratio may be computed using HEGO sensor readings sampled at the same time such that the readings are time-aligned, or instantaneous. Furthermore, such a HEGO signal ratio may be continuously computed in order to provide catalyst control system 214 with the most current feedback signal. A method for identifying and mitigating air-fuel imbalance faults using a ratio of HEGO signals is described further herein and with regard to FIG. 3.

In another example, comparing time-aligned readings from exhaust gas sensors comprises calculating a difference of both HEGO signals, for example, $HEGO_1-HEGO_2$. If the exhaust flow is uniform, the HEGO signals will be identical and the difference will equal zero. Any non-uniformity in the exhaust flow will result in a variation between HEGO signals, and therefore the difference will be greater than or less than zero. Therefore, in some embodiments, outer-loop controller 205 may compute the difference $HEGO_1-HEGO_2$ and utilize the result when generating the air-fuel ratio reference signal. For example, a HEGO difference greater than zero indicates that at least one of the cylinders has an air-fuel imbalance rich or lean of stoichiometry. Outer-loop controller 205 may then determine which HEGO signal, $HEGO_1$ or $HEGO_2$, exhibits more activity and is therefore more representative of the detected imbalance. The more representative HEGO signal may then be used to generate an air-fuel ratio command. However, in some examples, a weighted average of the multiple HEGO signals may be used to generate an air-fuel ratio command. Furthermore, a HEGO difference may indicate the fault direction, rich or lean, for a particular cylinder. For example, a HEGO difference greater than zero may correspond to a first cylinder with a rich imbalance or a second cylinder with a lean imbalance. Therefore, a first air-fuel ratio may be commanded to the first cylinder to correct for a rich imbalance; if this first air-fuel ratio command corrects the imbalance (that is, returns the difference to zero), then the first cylinder may be identified as the faulted cylinder. If the first air-fuel ratio command does not correct the imbalance by returning the difference to zero, then a second air-fuel ratio may be commanded to the second cylinder to correct for a lean imbalance; if this second air-fuel ratio command corrects the imbalance by returning the difference to zero, then the second cylinder may be identified as the faulted cylinder. Note that a HEGO signal difference may be computed using HEGO sensor readings sampled at the same time such that the readings are time-aligned, or instantaneous. Furthermore, such a HEGO signal difference may be continuously computed in order to provide catalyst control system 214 with the most current feedback signal. A method for identifying and mitigating air-fuel imbalance faults using a difference of HEGO signals is described further herein and with regard to FIG. 4.

FIG. 3 is a high-level flow chart illustrating an example method 300 for identifying and mitigating air-fuel imbalance faults using a dual HEGO system in accordance with the current disclosure. In particular, method 300 relates to using a ratio of HEGO signals to identify and mitigate an air-fuel imbalance fault associated with a specific cylinder. Method 300 will be described herein with reference to the components and systems depicted in FIGS. 1 and 2, though it should be understood that the method may be applied to other systems without departing from the scope of this disclosure. Method 300 may be carried out by controller 12, and may be stored as executable instructions in non-transitory memory.

Method 300 may begin at 305. At 305, method 300 may include evaluating operating conditions. Operating conditions may include, but are not limited to, engine operating status, combustion air-fuel ratio, $HEGO_1$ sensor data, $HEGO_2$ sensor data, engine coolant temperature, catalyst temperature, etc. Operating conditions may be measured by one or more sensors coupled to controller 12, or may be estimated or inferred based on available data.

Continuing at 310, method 300 may include calculating the ratio of HEGO signal feedback signals, for example, $HEGO_1/HEGO_2$. The HEGO signal ratio $HEGO_1/HEGO_2$ may then be filtered to improve the signal-to-noise ratio of the ratio. Method 300 may then continue to 315.

At 315, method 300 may include determining if the HEGO signal ratio is greater than or equal to one. The HEGO signal ratio equals one if the HEGO signals are identical, indicating a uniform, un-zoned flow. HEGO sensor voltage may range from 0 volts to 1 volt. Thus, if the HEGO signal ratio $HEGO_1/HEGO_2$ is greater than one, then $HEGO_1$ is less than $HEGO_2$. If the HEGO signal ratio is less than one, then $HEGO_1$ is greater than $HEGO_2$.

If the HEGO signal ratio is less than one, method 300 continues to 320. At 320, method 300 may include determining if the HEGO signal ratio is less than or equal to a threshold, for example, $threshold_1$. $Threshold_1$ may establish a threshold for the HEGO signal ratio such that if the ratio is greater than the threshold, then the ratio is approximately one. In this way, the method is robust to small, transient changes in the exhaust flow not due to cylinder imbalance faults. For example, $threshold_1$ may be 0.9, so that a ratio of 0.95 may be considered close enough to unity to disregard while a ratio of 0.9 may indicate an air-fuel imbalance fault. In other examples, $threshold_1$ may not equal 0.9, but may equal some value greater than or less than 0.9. In some examples, $threshold_1$ may be based on the HEGO set-point voltage, as a different set-point may allow for more or less variation in HEGO sensor readings. If the ratio is greater than $threshold_1$, then method 300 continues to 325.

At 325, method 300 may include maintaining the operating conditions evaluated at 305. Maintaining the operating conditions may further include using $HEGO_1$, $HEGO_2$, or a combination thereof as a feedback signal for outer-loop controller 205. Method 300 may then end. Returning to 320, if the ratio is less than or equal to $threshold_1$, method 300 may proceed to 330.

At 330, method 300 may include using a weighted HEGO signal arbitrated towards a predetermined HEGO signal. In general, feedback control to the outer-loop controller 205 should be weighted towards the HEGO with more activity. Since the ratio $HEGO_1/HEGO_2$ is less than or equal to $threshold_1$, control should be weighted towards $HEGO_1$. Thus, in some examples, the signal used for outer-loop feedback control may comprise a weighted average of the $HEGO_1$ and $HEGO_2$ signals, with more weight towards $HEGO_1$. In other examples, the $HEGO_1$ signal may be used alone for outer-loop feedback while the $HEGO_2$ signal is discarded, i.e., the outer-loop feedback control signal is entirely weighted towards the $HEGO_1$ signal. Given an error based on the weighted HEGO signal and a predetermined HEGO reference signal, outer-loop controller 205 outputs an appropriate UEGO reference signal, or air-fuel ratio reference signal, to inner-loop controller 207. Method 300 then continues to 335.

At 335, method 300 may include manipulating an injector pulse width for each cylinder for a HEGO associated with that bank until the ratio is approximately one. For example, if there are two cylinders in a cylinder bank associated with the dual HEGO sensors and at least one is determined to have an air-fuel imbalance fault at 320, then inner-loop controller 207 sequentially commands an adjusted fuel injector pulse width to a fuel injector associated with each cylinder. After injecting a first cylinder with the adjusted fuel amount, the HEGO signal ratio is recalculated. If the ratio is now approximately one—precisely, within a threshold range of one—then the air-fuel imbalance fault is associated with that first cylinder. If the ratio is not approximately one, then the air-fuel imbalance fault is not associated with that first cylinder, and the adjusted fuel injector pulse width is commanded to a fuel injector associated with the second cylinder. After injecting the second cylinder with the adjusted fuel amount, the HEGO signal ratio is recalculated. In some examples, the HEGO signal ratio is continuously and instantaneously calculated. If the ratio is now approximately one, then the air-fuel imbalance fault is associated with that second cylinder. In some examples, inner-loop controller 207 may command an unadjusted fuel injector pulse width to a second cylinder while commanding an adjusted fuel injector pulse width to a first cylinder and vice versa. In this way, the air-fuel imbalance fault can be associated with the appropriate cylinder. The example discussed hereinabove refers to only two cylinders, though any number of cylinders other than two may also be used in other examples.

Continuing at 340, method 300 may include faulting the cylinder which returned the ratio to approximately one. Faulting the cylinder which returned the ratio to approximately one may include, for example, storing the fault incident in non-transitory memory in controller 12 so that repeated faults may be monitored. If a particular cylinder has repeated air-fuel imbalance faults, controller 12 may indicate a malfunction associated with the particular cylinder. Indicating such a malfunction may include activating a malfunction indicator light (MIL), generating a diagnostic code indicating the specific cylinder fault, and the like. Method 300 may then end.

Returning to 315, if the HEGO signal ratio is greater than or equal to one, then method 300 continues to 345. At 345, method 300 may include determining if the HEGO signal ratio is greater than or equal to a threshold, for example, threshold$_2$. Threshold$_2$ may establish a threshold for the HEGO signal ratio such that if the ratio is less than the threshold, then the ratio is approximately one. In this way, the method is robust to small, transient changes in the exhaust flow not due to cylinder imbalance faults. For example, threshold$_2$ may be 1.1, so that a ratio of 1.05 may be considered close enough to unity to disregard while a ratio of 1.1 may indicate an air-fuel imbalance fault. In other examples, threshold$_2$ may not equal 1.1, but may equal some value greater than or less than 1.1. In some examples, threshold$_2$ may be based on the HEGO set-point voltage, as a different set-point may allow for more or less variation in HEGO sensor readings. If the ratio is less than threshold$_2$, method 300 continues to 350.

At 350, method 300 may include maintaining operating conditions, such as the operating conditions evaluated at 305. Method 300 may then end. Returning to 345, if the HEGO signal ratio is greater than or equal to threshold$_2$, then method 300 may continue to 355.

At 355, method 300 may include using a weighted HEGO signal arbitrated towards a predetermined HEGO signal. In general, feedback control to the outer-loop controller 205 should be weighted towards the HEGO with more activity. Since the ratio HEGO$_1$/HEGO$_2$ is greater than or equal to threshold$_2$, control should be weighted towards HEGO$_2$. Thus, in some examples, the signal used for outer-loop feedback control may comprise a weighted average of the HEGO$_1$ and HEGO$_2$ signals, with more weight towards HEGO$_2$. In other examples, the HEGO$_2$ signal may be used alone for outer-loop feedback while the HEGO$_1$ signal is discarded, i.e., the outer-loop feedback control signal is entirely weighted towards the HEGO$_2$ signal. Given an error based on the weighted HEGO signal and a predetermined HEGO reference signal, outer-loop controller 205 outputs an appropriate UEGO reference signal, or air-fuel ratio reference signal, to inner-loop controller 207. Method 300 then continues to 360.

At 360, method 300 may include manipulating an injector pulse width for each cylinder for a HEGO associated with that bank until the HEGO signal ratio is approximately one. For example, if there are two cylinders in a cylinder bank associated with the dual HEGO sensors and at least one is determined to have an air-fuel imbalance fault at 320, then inner-loop controller 207 sequentially commands an adjusted fuel injector pulse width to a fuel injector associated with each cylinder. After injecting a first cylinder with the adjusted fuel amount, the HEGO signal ratio is recalculated. If the ratio is now approximately one—precisely, within a threshold range of one—then the air-fuel imbalance fault is associated with that first cylinder. If the ratio is not approximately one, then the air-fuel imbalance fault is not associated with that first cylinder, and the adjusted fuel injector pulse width is commanded to a fuel injector associated with the second cylinder. After injecting the second cylinder with the adjusted fuel amount, the HEGO signal ratio is recalculated. If the ratio is now approximately one, then the air-fuel imbalance fault is associated with that second cylinder. In some examples, inner-loop controller 207 may command an unadjusted fuel injector pulse width to a second cylinder while commanding an adjusted fuel injector pulse width to a first cylinder and vice versa. In this way, the air-fuel imbalance fault can be associated with the appropriate cylinder. The example discussed hereinabove refers to only two cylinders, though any number of cylinders other than two may also be used in other examples.

Continuing at 365, method 300 may include faulting the cylinder which returned the ratio to approximately one. Faulting the cylinder which returned the ratio to approximately one may include, for example, storing the fault incident in non-transitory memory in controller 12 so that repeated faults may be monitored. If a particular cylinder has repeated air-fuel imbalance faults, controller 12 may indicate a malfunction associated with the particular cylinder. Indicating such a malfunction may include activating a malfunction indicator light (MIL), generating a diagnostic code indicating the specific cylinder fault, and the like. Method 300 may then end.

FIG. 4 is a high-level flow chart illustrating an example method 400 for identifying and mitigating air-fuel imbalance faults using a dual HEGO system in accordance with the current disclosure. In particular, method 400 relates to using a difference of HEGO signals to identify and mitigate an air-fuel imbalance fault associated with a specific cylinder. Method 400 will be described herein with reference to the components and systems depicted in FIGS. 1 and 2, though it should be understood that the method may be applied to other systems without departing from the scope of this disclosure. Method 400 may be carried out by controller 12, and may be stored as executable instructions in non-transitory memory.

Method 400 may begin at 405. At 405, method 400 may include evaluating operating conditions. Operating conditions may include, but are not limited to, engine operating status, combustion air-fuel ratio, $HEGO_1$ sensor data, $HEGO_2$ sensor data, engine coolant temperature, catalyst temperature, etc. Operating conditions may be measured by one or more sensors coupled to controller 12, or may be estimated or inferred based on available data.

Continuing at 410, method 400 may include calculating the difference of HEGO signal feedback signals, for example, $HEGO_1-HEGO_2$. The HEGO signal difference $HEGO_1-HEGO_2$ may then be filtered to improve the signal-to-noise ratio of the difference. Method 400 may then continue to 415.

At 415, method 400 may include determining if the HEGO signal difference is greater than zero. The HEGO signal difference equals zero if the HEGO signals are identical, indicating a uniform, un-zoned flow. If the HEGO signal difference $HEGO_1-HEGO_2$ is greater than zero, then the value of $HEGO_1$ is greater than the value of $HEGO_2$. If the HEGO signal difference is less than zero, then the value of $HEGO_1$ is less than the value of $HEGO_2$.

If the HEGO signal difference is less than zero, then method 400 continues to 420. At 420, method 400 may include determining if the HEGO signal difference is less than or equal to a threshold, for example, $threshold_1$. $Threshold_1$ may establish a threshold for the HEGO signal difference such that if the difference is greater than the threshold, then the difference is approximately zero. In this way, the method is robust to small, transient changes in the exhaust flow not due to cylinder imbalance faults. For example, $threshold_1$ may be −0.1, such that a difference of −0.05 may be considered close enough to zero to disregard while a difference of −0.1 may indicate an air-fuel imbalance fault. In other examples, $threshold_1$ may not equal −0.1, but may equal some value greater than or less than −0.1. In some examples, $threshold_1$ may be based on the HEGO set-point voltage, as a different set-point may allow for more or less variation in HEGO sensor readings. If the difference is greater than $threshold_1$, then method 400 continues to 425.

At 425, method 400 may include maintaining the operating conditions, for example the operating conditions evaluated at 405. In this way, no fault is identified if the difference is within a threshold range of zero. Method 400 may then end. If the difference is less than or equal to $threshold_1$, then method 400 may continue to 430.

At 430, method 400 may include using a weighted HEGO signal arbitrated towards the predetermined HEGO signal. In general, feedback control to the outer-loop controller 205 should be weighted towards the HEGO with more activity. Since the difference $HEGO_1-HEGO_2$ is less than or equal to $threshold_1$, control should be weighted towards $HEGO_1$. Thus, in some examples, the signal used for outer-loop feedback control may comprise a weighted average of the $HEGO_1$ and $HEGO_2$ signals, with more weight towards $HEGO_1$. In other examples, the $HEGO_1$ signal may be used alone for outer-loop feedback while the $HEGO_2$ signal is discarded, i.e., the outer-loop feedback control signal is entirely weighted towards the $HEGO_1$ signal. Given an error based on the weighted HEGO signal and a predetermined HEGO reference signal, outer-loop controller 205 outputs an appropriate UEGO reference signal, or air-fuel ratio reference signal, to inner-loop controller 207. Method 400 then continues to 435.

At 435, method 400 may include manipulating an injector pulse width for each cylinder for a HEGO associated with that bank until the HEGO signal difference is approximately zero. For example, if there are two cylinders in a cylinder bank associated with the dual HEGO sensors and at least one is determined to have an air-fuel imbalance fault at 420, then inner-loop controller 207 sequentially commands an adjusted fuel injector pulse width to a fuel injector associated with each cylinder. After injecting a first cylinder with the adjusted fuel amount, the HEGO signal difference is recalculated. If the difference is now approximately zero—precisely, within a threshold range of zero—then the air-fuel imbalance fault is associated with the first cylinder. If the difference is not approximately zero, then the air-fuel imbalance fault is not associated with the first cylinder, and the adjusted fuel injector pulse width is commanded to a fuel injector associated with the second cylinder. After injecting the second cylinder with the adjusted fuel amount, the HEGO signal difference is recalculated. If the difference is now approximately zero, then the air-fuel imbalance fault is associated with the second cylinder. In some examples, inner-loop controller 207 may command an unadjusted fuel injector pulse width to a second cylinder while commanding an adjusted fuel injector pulse width to a first cylinder and vice versa. In this way, an air-fuel imbalance fault specific to a cylinder can be identified and associated with the appropriate cylinder. The example discussed hereinabove refers to only two cylinders, though any number of cylinders other than two may also be used in other examples.

Continuing at 440, method 400 may include faulting the cylinder which returned the difference to approximately zero. Faulting the cylinder which returned the difference to approximately zero may include, for example, storing the fault incident in non-transitory memory in controller 12 so that repeated faults may be monitored. If a particular cylinder has repeated air-fuel imbalance faults, controller 12 may indicate a malfunction associated with the particular cylinder. Indicating such a malfunction may include activating a malfunction indicator light (MIL), generating a diagnostic code indicating the specific cylinder fault, and the like. Method 400 may then end.

Returning to 415, if the HEGO signal difference is greater than or equal to zero, method 400 continues to 445. At 445, method 400 may include determining if the HEGO signal difference is greater than or equal to a threshold, for example, $threshold_2$. $Threshold_2$ may establish a threshold for the HEGO signal difference such that if the difference is less than the threshold, then the difference is approximately zero. In this way, the method is robust to small, transient changes in the exhaust flow not due to cylinder imbalance faults. For example, $threshold_2$ may be 0.1, such that a difference of 0.05 may be considered close enough to zero to disregard while a difference of 0.1 may indicate an air-fuel imbalance fault. In other examples, $threshold_2$ may not equal 0.1, but may equal some value greater than or less than 0.1. In some examples, $threshold_2$ may be based on the HEGO set-point voltage, as a different set-point may allow for more or less variation in HEGO sensor readings. If the difference is less than $threshold_2$, then method 400 continues to 450.

At 450, method 400 may include maintaining operating conditions, such as the operating conditions evaluated at 405. In this way, no fault is identified if the difference is within a threshold range of zero. Method 400 may then end.

If the difference is greater than or equal to threshold$_2$, then method 400 may continue to 455.

At 455, method 400 may include using a weighted HEGO signal arbitrated towards a predetermined HEGO. In general, feedback control to the outer-loop controller 205 should be weighted towards the HEGO with more activity. Since the difference HEGO$_1$–HEGO$_2$ is greater than or equal to threshold$_2$, control should be weighted towards HEGO$_1$. Thus, in some examples, the signal used for outer-loop feedback control may comprise a weighted average of the HEGO$_1$ and HEGO$_2$ signals, with more weight towards HEGO$_1$. In other examples, the HEGO$_1$ signal may be used alone for outer-loop feedback while the HEGO$_2$ signal is discarded, i.e., the outer-loop feedback control signal is entirely weighted towards the HEGO$_1$ signal. Given an error based on the weighted HEGO signal and a predetermined HEGO reference signal, outer-loop controller 205 outputs an appropriate UEGO reference signal, or air-fuel ratio reference signal, to inner-loop controller 207. Method 400 then continues to 435.

At 460, method 400 may include manipulating an injector pulse width for each cylinder for a HEGO associated with that bank until the difference is approximately zero. For example, if there are two cylinders in a cylinder bank associated with the dual HEGO sensors and at least one is determined to have an air-fuel imbalance fault at 420, then inner-loop controller 207 sequentially commands an adjusted fuel injector pulse width to a fuel injector associated with each cylinder. After injecting a first cylinder with the adjusted fuel amount, the HEGO signal difference is recalculated. If the difference is now approximately zero—precisely, within a threshold range of zero—then the air-fuel imbalance fault is associated with that first cylinder. If the difference is not approximately zero, then the air-fuel imbalance fault is not associated with that first cylinder, and the adjusted fuel injector pulse width is commanded to a fuel injector associated with the second cylinder. After injecting the second cylinder with the adjusted fuel amount, the HEGO signal difference is recalculated. If the difference is now approximately zero, then the air-fuel imbalance fault is associated with that second cylinder. In some examples, inner-loop controller 207 may command an unadjusted fuel injector pulse width to a second cylinder while commanding an adjusted fuel injector pulse width to a first cylinder and vice versa. In this way, the air-fuel imbalance fault can be associated with the appropriate cylinder. The example discussed hereinabove refers to only two cylinders, though any number of cylinders other than two may also be used in other examples.

At 465, method 400 may include faulting the cylinder which returned the difference to approximately zero. Faulting the cylinder which returned the difference to approximately zero may include, for example, storing the fault incident in non-transitory memory in controller 12 so that repeated faults may be monitored. If a particular cylinder has repeated air-fuel imbalance faults, controller 12 may indicate a malfunction associated with the particular cylinder. Indicating such a malfunction may include activating a malfunction indicator light (MIL), generating a diagnostic code indicating the specific cylinder fault, and the like. Method 400 may then end.

FIG. 5 shows a set of graphs 500 illustrating example results for vehicle data without air-fuel imbalance faults. The set of graphs 500 include measurements of HEGO voltages for a dual HEGO system as described herein as well as the ratio and difference of the HEGO voltages as described herein respectively with regard to FIGS. 3 and 4.

In particular, plot 511 represents a HEGO setpoint voltage over time; plot 513 represents a HEGO$_1$ voltage over time; plot 523 represents a HEGO$_2$ voltage over time; plot 531 represents a filtered ratio HEGO$_1$/HEGO$_2$ over time; and plot 541 represents a filtered difference HEGO$_1$–HEGO$_2$ over time.

Graphs 500 demonstrate a baseline performance of the system and methods. As shown by plots 513 and 523, the HEGO signals are nearly identical in shape and magnitude. Thus the ratio HEGO$_1$/HEGO$_2$ equals one (within a threshold range) as depicted by plot 531, and the difference HEGO$_1$–HEGO$_2$ equals zero (within a threshold range) as depicted by plot 541.

FIG. 6 shows a set of graphs 600 illustrating example results for vehicle data with rich air-fuel imbalance faults. Rich air-fuel imbalance faults are induced on a particular cylinder 230 to demonstrate the efficacy of the methods of FIGS. 3 and 4. The set of graphs 600 include measurements of HEGO voltages for a dual HEGO system as described herein plotted over time.

In particular, plot 611 represents a HEGO setpoint voltage over time; plot 613 represents a HEGO$_1$ voltage over time; and plot 623 represents a HEGO$_2$ voltage over time. Furthermore, plots 631, 633, 635, and 637 represent a filtered ratio HEGO$_1$/HEGO$_2$ over time, where in particular: plot 631 corresponds to no air-fuel imbalance; plot 633 corresponds to a 10% rich air-fuel cylinder imbalance; plot 635 corresponds to a 15% rich air-fuel cylinder imbalance; and plot 637 corresponds to a 20% rich air-fuel cylinder imbalance. Further still, plots 641, 643, 645, and 647 represent a filtered difference HEGO$_1$–HEGO$_2$ over time, where in particular: plot 641 corresponds to no air-fuel imbalance; plot corresponds to a 10% rich air-fuel cylinder imbalance; plot corresponds to a 15% rich air-fuel cylinder imbalance; and plot 647 corresponds to a 20% rich air-fuel cylinder imbalance.

Note that the HEGO setpoint voltage shown by plot 611 is equivalent to the HEGO setpoint voltage shown by plot 511 of FIG. 5. Similarly the baseline HEGO ratio and difference plots 631 and 641 are equivalent to plots 531 and 541 of FIG. 5. Such plots are included to emphasize the different behavior of the system with a rich air-fuel imbalance fault.

With 10, 15, and 20% rich air-fuel imbalance faults induced, the HEGO signals are no longer similar in shape and magnitude as shown by plots 613 and 623. The ratio and difference of HEGO$_1$ and HEGO$_2$ are significantly distinct from the no fault case shown by plots 631 and 641 and described further hereinabove with regard to FIG. 5. As shown by plots 633, 635, and 637, the HEGO signal ratio has a value greater than one. As shown by plots 643, 645, and 647, the HEGO signal difference has a value greater than zero. This distinction can be used as confirmation that an air-fuel imbalance fault exists and further indicates which HEGO should be used for control. In general, control should be weighted towards the HEGO with more activity. In these examples, HEGO$_2$ may be more advantageous for control due to the switching activity rich and lean of stoichiometry shown by plot 623. With a more representative signal such as HEGO$_2$, feedback to the outer-loop controller 205 may be more representative of the tailpipe emissions, thus enabling control to more efficiently regulate the overall tailpipe emissions and ultimately allow for fault threshold levels to be increased.

FIG. 7 shows a set of graphs 700 illustrating example results for vehicle data with lean air-fuel imbalance faults. Lean air-fuel imbalance faults are induced on a particular cylinder 230 to demonstrate the efficacy of the methods of FIGS. 3 and 4. The set of graphs 700 include measurements of HEGO voltages for a dual HEGO system as described herein plotted over time. In particular, plot 711 represents a HEGO setpoint voltage over time; plot 713 represents a $HEGO_1$ voltage over time; plot 723 represents a $HEGO_2$ voltage over time; plot 731 represents a filtered ratio $HEGO_1/HEGO_2$ over time for no fault; plot 733 represents a filtered ratio $HEGO_1/HEGO_2$ over time with a 15% lean air-fuel cylinder imbalance; plot 741 represents a filtered difference $HEGO_1/HEGO_2$ over time for no fault; and plot 743 represents a filtered difference $HEGO_1-HEGO_2$ over time for a 15% lean air-fuel imbalance fault.

Note that the HEGO setpoint voltage shown by plot 711 is equivalent to the HEGO setpoint voltage shown by plot 511 of FIG. 5. Similarly the baseline HEGO ratio and difference plots 731 and 741 are equivalent to plots 531 and 541 of FIG. 5. Such plots are included to emphasize the different behavior of the system with a lean air-fuel imbalance fault.

With a 15% lean air-fuel imbalance fault induced, the HEGO signals are no longer similar in shape and magnitude as compared to baseline (plots 731 and 741). However, the ratio $HEGO_1/HEGO_2$ now has a value less than one and the difference $HEGO_1-HEGO_2$ less than zero as shown by plots 733 and 743, which is the opposite result compared to the rich faults depicted in FIG. 6. In this example, the $HEGO_1$ signal may be ideal for catalyst control due to the high $HEGO_1$ activity shown by plot 713.

Note that each cylinder may have a different ratio (greater or less than one) and difference (positive or negative) with either a rich or lean fault. For example, a first cylinder as described above produced a ratio greater than one and a difference greater than zero for a rich air-fuel imbalance, and produced a ratio less than one and a difference less than zero for a lean air-fuel imbalance. A second cylinder, however, may produce the opposite results of the first cylinder. For example, a second cylinder may produce a ratio less than one and a difference less than zero for a lean air-fuel imbalance, and similarly produce a ratio greater than one and a difference greater than zero for a lean air-fuel imbalance. Therefore, a predetermined outcome may be mapped to a fault direction, rich or lean of stoichiometry, on each cylinder. In this way, an air-fuel imbalance fault may be mitigated by manipulating the cylinder injector pulse width rich or lean for the identified cylinder bank. When the difference or ratio adjusts back towards zero or one, respectively, the cylinder may then be identified as faulted and adjusted to meet emission targets.

A fault threshold may be established to correspond to the range of authority for injector pulse width adjustments. When the range of authority has been depleted for adjusting the injector pulse width to mitigate the air-fuel imbalance fault, the fault threshold is crossed and a malfunction light indicator (MIL) may be activated. In this way, minor air-fuel imbalance faults may be identified and mitigated without issue while major faults corresponding to more serious degradation and malfunction may be indicated.

FIG. 8 shows a graph 800 illustrating tailpipe emissions in the presence of a rich air-fuel imbalance fault in a first cylinder. In particular, graph 800 shows tailpipe emissions for different control approaches. As discussed further herein, graph 800 shows that tailpipe emissions are significantly reduced when control is given to the appropriate HEGO sensor.

Threshold 811 represents tier 2, bin 4 ultra-low emission vehicle (ULEV) II emissions regulations, wherein the maximum allowable NOx emissions are 0.07 grams per mile and the maximum allowable CO emissions are 2.1 grams per mile. Threshold 813 represents air-fuel imbalance fault threshold levels achieved by the methods of the current disclosure, wherein the maximum allowed NOx emissions are 0.105 grams per mile and the maximum allowed CO emissions are 3.15 grams per mile.

The diamond 815 represents baseline tailpipe emissions in the absence of an air-fuel imbalance fault. The circles 821 and 823 represent tailpipe emissions for a 10% rich air-fuel imbalance fault when the $HEGO_2$ signal is used for outer-loop control. The triangle 831 represents tailpipe emissions for a 15% rich air-fuel imbalance fault when the $HEGO_2$ signal is used for outer-loop control. The square 835 represents tailpipe emissions for a 20% rich air-fuel imbalance fault when the $HEGO_2$ signal is used for outer-loop control. In this example, square 835 defines the limits of threshold 813. The hexagon 841 represents tailpipe emissions for a 10% rich air-fuel imbalance fault when the $HEGO_1$ signal is used for outer-loop control. In this example, a third HEGO sensor $HEGO_3$ was placed further downstream from $HEGO_1$ and $HEGO_2$ where exhaust flow was considered to be uniform. The star 850 represents tailpipe emissions for a 10% rich air-fuel imbalance fault when the $HEGO_3$ signal is used for outer-loop control.

As indicated by hexagon 841 and circles 821 and 823, NOx emissions are significantly smaller when control is given to the correct HEGO signal. For a 10% rich air-fuel imbalance fault, NOx emissions are reduced by 70% when control is arbitrated from $HEGO_1$ to $HEGO_2$. As indicated by star 850, tailpipe emissions for a 10% rich air-fuel imbalance fault are still well outside the threshold emission target when using $HEGO_3$ for control: NOx emissions are reduced by 60% when control is arbitrated from $HEGO_3$ to $HEGO_2$. Hence the dual HEGO method, wherein two HEGO sensors are symmetrically opposed, has a demonstrated advantage over a single HEGO, even when the single HEGO is located further down the tailpipe where the exhaust flow is more uniform.

Though the systems and methods described above include two HEGO sensors positioned opposite to each other in the tailpipe, in some examples more than two HEGO sensors may be symmetrically opposed within the tailpipe. With more than two HEGO sensors, multiple HEGO sensor ratios and/or differences may be computed in order to utilize the methods described herein with regard to FIGS. 3 and 4. For a system with three HEGO sensors symmetrically opposed in the tailpipe, for example, the methods described hereinabove may be extended to include computing a difference between a first and second HEGO sensor, a difference between a second and third HEGO sensor, a difference between a first and third HEGO sensor. In this way, the resolution of exhaust flow monitoring may be increased and the specific imbalanced cylinder may be more quickly identified and faulted.

By computing a difference or ratio of two HEGO signals, a non-uniform exhaust flow due to an air-fuel ratio cylinder imbalance, where the air-fuel ratio in one or more cylinders is different from the other cylinders due to a cylinder-specific malfunction, may be identified and mitigated. In this way, tailpipe emissions may be maintained below regulated emissions levels.

As one embodiment, a method comprises indicating a cylinder imbalance by comparing time-aligned readings from exhaust gas oxygen sensors, the exhaust gas oxygen sensors positioned symmetrically opposite each other within an exhaust passage downstream of a catalyst. In some examples, the exhaust gas oxygen sensors comprise two heated exhaust gas oxygen sensors.

In one example, comparing time-aligned readings from exhaust gas oxygen sensors comprises computing a ratio of the time-aligned readings from exhaust gas oxygen sensors. The cylinder imbalance is indicated when the ratio is outside a threshold range centered at one. The threshold range is based on an exhaust gas oxygen sensor setpoint.

In another example, comparing time-aligned readings from exhaust gas oxygen sensors comprises computing a difference of the time-aligned readings from exhaust gas oxygen sensors. The cylinder imbalance is indicated when the difference is outside a threshold range centered at zero. The threshold range is based on an exhaust gas oxygen sensor setpoint.

As another embodiment, a method comprises indicating a cylinder imbalance by comparing time-aligned readings from exhaust gas oxygen sensors, the exhaust gas oxygen sensors positioned symmetrically opposite each other within an exhaust passage downstream of a catalyst, and selecting one of the exhaust gas oxygen sensors to use for outer loop control.

For example, comparing time-aligned readings from exhaust gas oxygen sensors comprises computing a ratio of the time-aligned readings from exhaust gas oxygen sensors. In one example, selecting one of the exhaust gas oxygen sensors comprises selecting a first sensor of the exhaust gas oxygen sensors responsive to the ratio above a threshold range. In another example, selecting one of the exhaust gas oxygen sensors comprises selecting a second sensor of the exhaust gas oxygen sensors responsive to the ratio below a threshold range.

As another example, comparing time-aligned readings from exhaust gas oxygen sensors comprises computing a difference of the time-aligned readings from exhaust gas oxygen sensors. In one example, selecting one of the exhaust gas oxygen sensors comprises selecting a first sensor of the exhaust gas oxygen sensors responsive to the difference above a threshold range. In another example, selecting one of the exhaust gas oxygen sensors comprises selecting a second sensor of the exhaust gas oxygen sensors responsive to the difference below a threshold range.

As another embodiment, a method comprises indicating a cylinder imbalance by comparing time-aligned readings from exhaust gas oxygen sensors, the exhaust gas oxygen sensors positioned symmetrically opposite each other within an exhaust passage downstream of a catalyst, selecting one of the exhaust gas oxygen sensors for outer loop control, and adjusting fuel sequentially to individual cylinders to indicate which cylinder is imbalanced. In some examples, comparing the time-aligned readings from the exhaust gas oxygen sensors is continuous and instantaneous.

In some examples, adjusting fuel sequentially to individual cylinders to indicate which cylinder is imbalanced comprises adjusting a fuel pulse width based on the selected exhaust gas oxygen sensor, and sequentially commanding the adjusted fuel pulse width to individual cylinders until comparing the time-aligned readings from the exhaust gas oxygen sensors no longer indicates the cylinder imbalance. In some examples, adjusting the fuel pulse width based on the selected exhaust gas oxygen sensor is further based on the individual cylinders. The method further comprises assigning a fault to the imbalanced cylinder.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
indicating a cylinder imbalance by using a controller to compare time-aligned readings from exhaust gas oxygen sensors, the controller determining if the compared time-aligned readings fall outside of a threshold, the exhaust gas oxygen sensors positioned downstream of a catalyst symmetrically opposite each other within an exhaust passage across a plane passing lengthwise through the exhaust passage.

2. The method of claim 1, wherein comparing time-aligned readings from exhaust gas oxygen sensors comprises computing a ratio of the time-aligned readings from the exhaust gas oxygen sensors.

3. The method of claim 2, wherein the cylinder imbalance is indicated when the ratio is outside a threshold range centered at one.

4. The method of claim 1, wherein comparing time-aligned readings from exhaust gas oxygen sensors comprises computing a difference of the time-aligned readings from the exhaust gas oxygen sensors.

5. The method of claim 4, wherein the cylinder imbalance is indicated when the difference is outside a threshold range centered at zero.

6. The method of claim 1, wherein determining if the compared time-aligned readings fall outside of the threshold comprises adjusting fuel pulse width to individual cylinders until comparing the time-aligned readings from the exhaust gas oxygen sensors no longer indicates the cylinder imbalance.

7. A method, comprising:
indicating a cylinder imbalance by using a controller to compare time-aligned readings from exhaust gas oxygen sensors, the controller determining if the compared time-aligned readings fall outside of a threshold, the exhaust gas oxygen sensors positioned downstream of a catalyst symmetrically opposite each other within an exhaust passage across a plane passing lengthwise through the exhaust passage; and
selecting one of the exhaust gas oxygen sensors for use in a reference signal by the controller.

8. The method of claim 7, wherein comparing time-aligned readings from exhaust gas oxygen sensors comprises computing a ratio of the time-aligned readings from the exhaust gas oxygen sensors.

9. The method of claim 8, wherein selecting one of the exhaust gas oxygen sensors comprises selecting a first sensor of the exhaust gas oxygen sensors responsive to the ratio above a threshold range.

10. The method of claim 8, wherein selecting one of the exhaust gas oxygen sensors comprises selecting a second sensor of the exhaust gas oxygen sensors responsive to the ratio below a threshold range.

11. The method of claim 7, wherein comparing time-aligned readings from exhaust gas oxygen sensors comprises computing a difference of the time-aligned readings from the exhaust gas oxygen sensors.

12. The method of claim 11, wherein selecting one of the exhaust gas oxygen sensors comprises selecting a first sensor of the exhaust gas oxygen sensors responsive to the difference above a threshold range.

13. The method of claim 11, wherein selecting one of the exhaust gas oxygen sensors comprises selecting a second sensor of the exhaust gas oxygen sensors responsive to the difference below a threshold range.

14. The method of claim 7, wherein determining if the compared time-aligned readings fall outside of the threshold comprises adjusting fuel pulse width to individual cylinders based on the selected sensor until comparing the time-aligned readings from the exhaust gas oxygen sensors no longer indicates the cylinder imbalance.

15. The method of claim 14, wherein adjusting fuel pulse width to individual cylinders based on the selected sensor comprises generating a pulse width command based on a weighted average of multiple sensor signals.

16. A method, comprising:
indicating a cylinder imbalance by using a controller to compare time-aligned readings from exhaust gas oxygen sensors, the controller determining if the compared time-aligned readings fall outside of a threshold, the exhaust gas oxygen sensors positioned downstream of a catalyst symmetrically opposite each other within an exhaust passage across a plane passing lengthwise through the exhaust passage;
selecting one of the exhaust gas oxygen sensors for use in a reference signal by the controller; and
adjusting, with the controller, fuel sequentially to individual cylinders to indicate which cylinder is imbalanced.

17. The method of claim 16, wherein comparing the time-aligned readings from the exhaust gas oxygen sensors is continuous and instantaneous.

18. The method of claim 16, wherein adjusting fuel sequentially to individual cylinders to indicate which cylinder is imbalanced comprises:
adjusting a fuel pulse width based on the selected exhaust gas oxygen sensor; and
sequentially commanding the adjusted fuel pulse width to individual cylinders until comparing the time-aligned readings from the exhaust gas oxygen sensors no longer indicates the cylinder imbalance.

19. The method of claim 18, wherein adjusting the fuel pulse width based on the selected exhaust gas oxygen sensor is further based on the individual cylinders.

20. The method of claim 18, further comprising assigning a fault to the cylinder which no longer indicates the cylinder imbalance due to the fuel adjustment.

* * * * *